US012073132B2

(12) United States Patent
Applin et al.

(10) Patent No.: US 12,073,132 B2
(45) Date of Patent: Aug. 27, 2024

(54) MULTI-FUNCTION DEVICE COMMUNITIES FOR TROUBLESHOOTING AND MAINTENANCE

(71) Applicant: Xerox Corporation, Norwalk, CT (US)

(72) Inventors: Amanda Applin, Jericho, VT (US); Kim P. Ciulla, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 41 days.

(21) Appl. No.: 17/655,332

(22) Filed: Mar. 17, 2022

(65) Prior Publication Data

US 2023/0297299 A1 Sep. 21, 2023

(51) Int. Cl.
*G06F 3/12* (2006.01)
*G06K 15/02* (2006.01)
*H04N 1/00* (2006.01)

(52) U.S. Cl.
CPC .......... *G06F 3/1225* (2013.01); *G06F 3/1204* (2013.01); *G06F 3/1286* (2013.01); *H04N 1/00962* (2013.01)

(58) Field of Classification Search
None
See application file for complete search history.

(56) References Cited

U.S. PATENT DOCUMENTS

| 7,100,085 B2 | 8/2006 | Miller |
| 7,634,551 B2 | 12/2009 | Tredoux et al. |
| 9,684,788 B2 | 6/2017 | Ferrara et al. |
| 2004/0123188 A1 | 6/2004 | Srinivasan et al. |
| 2004/0172469 A1* | 9/2004 | Takahashi ........... H04L 43/0817 709/224 |
| 2008/0244043 A1* | 10/2008 | Kawai ................ H04L 41/0856 709/221 |
| 2008/0271131 A1* | 10/2008 | Moore ................ H04L 41/0806 726/9 |
| 2009/0046686 A1* | 2/2009 | Izaki ....................... H04W 8/20 455/420 |
| 2010/0211814 A1* | 8/2010 | Satonaga .............. G06F 11/004 714/39 |

(Continued)

FOREIGN PATENT DOCUMENTS

| CN | 101807164 | * | 8/2010 | ............. G06F 11/00 |
| CN | 110730114 | * | 2/2021 | .......... H04W 12/065 |

(Continued)

*Primary Examiner* — Beniyam Menberu
(74) *Attorney, Agent, or Firm* — Tong, Rea, Bentley & Kim, LLC

(57) ABSTRACT

A multi-function device (MFD) is disclosed. For example, the MFD includes, a communication interface to establish a communication session with other MFDs within a community of MFDs, a processor, and a non-transitory computer readable medium storing instructions, which when executed by the processor, cause the processor to determine a feature of the MFD is operating incorrectly, transmit a help message to the other MFDs within the community of MFDs, receive a configuration file for the feature that is operating incorrectly from a second MFD within the community of MFDs that has a health status of fully operational, upload the configuration file, determine the feature is operating correctly after the configuration file is uploaded, and update a health status of the MFD to fully operational.

10 Claims, 6 Drawing Sheets

(56) References Cited

U.S. PATENT DOCUMENTS

| | | | | |
|---|---|---|---|---|
| 2015/0193175 A1* | 7/2015 | Mori | ............... | G06F 3/1228 |
| | | | | 358/1.15 |
| 2016/0291904 A1* | 10/2016 | Fukushima | ........... | G06F 3/1234 |
| 2017/0201635 A1* | 7/2017 | Takamoto | ............... | G06F 3/121 |
| 2020/0195789 A1* | 6/2020 | Takahashi | .......... | H04N 1/00244 |

FOREIGN PATENT DOCUMENTS

| | | | | |
|---|---|---|---|---|
| JP | H08244317 | * | 9/1996 | ............... H04N 1/32 |
| JP | 2006039915 | * | 2/2006 | ......... H04N 1/00244 |
| JP | 2006347110 | * | 12/2006 | ............... B41J 29/38 |
| JP | 2008097226 | * | 4/2008 | ............... B41J 29/38 |
| JP | 2010224642 | * | 10/2010 | ............... G06F 3/12 |
| JP | 4642352 | * | 3/2011 | ............. G06F 3/12 |
| JP | 2016192101 | * | 11/2016 | ............... G06F 3/12 |
| JP | 2019166654 | * | 10/2019 | ........ H04N 1/00244 |
| JP | 2020074137 | * | 5/2020 | ............... H04N 1/00 |
| JP | 6769286 | * | 10/2020 | ............... H04N 1/00 |

\* cited by examiner

MULTI-FUNCTION DEVICE COMMUNITIES FOR TROUBLESHOOTING AND MAINTENANCE

BACKGROUND

Multi-function devices (MFDs) are electronic devices that can perform a variety of different functions. For example, MFDs can print, scan, copy, fax, email scanned documents, transmit scanned documents to a network storage account, and the like. The MFDs can be customized to provide custom user interfaces, store custom workflows for different print jobs, and the like.

MFDs are complicated devices that run on complex software. The MFDs may have hundreds of settings that range from settings associated with how the software operates, communication settings for network communications, print job parameters, and the like.

SUMMARY

According to aspects illustrated herein, there are provided a multi-function device (MFD) and a method for troubleshooting an MFD via another MFD in a community of MFDs. One disclosed feature of the embodiments is an MFD that comprises a communication interface to establish a communication session with other MFDs within a community of MFDs, a processor, and a non-transitory computer readable medium storing instructions, which when executed by the processor, cause the processor to determine a feature of the MFD is operating incorrectly, transmit a help message to the other MFDs within the community of MFDs, receive a configuration file for the feature that is operating incorrectly from a second MFD within the community of MFDs that has a health status of fully operational, upload the configuration file, determine the feature is operating correctly after the configuration file is uploaded, and update a health status of the MFD to fully operational.

Another disclosed feature is an MFD comprising a communication interface to establish a communication session with other MFDs within a community of MFDs, a processor, and a non-transitory computer readable medium storing instructions, which when executed by the processor, cause the processor to monitor a health status of the other MFDs within the community of MFDs, determine the health status of a second MFD within the community of MFDs is partially operational, determine a feature of the second MFD that is operating incorrectly, generate a configuration file for the feature of the second MFD that is operating incorrectly, and transmit the configuration file to the second MFD.

Another disclosed feature is a method for troubleshooting an MFD via another MFD in a community of MFDs. The method executed by a processor of the enterprise owned MFD comprises monitoring a health status of other MFDs within a community of MFDs, determining the health status of a second MFD within the community of MFDs is partially operational, determining a feature of the second MFD that is operating incorrectly, generating a configuration file for the feature of the second MFD that is operating incorrectly, and transmitting the configuration file to the second MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses MFD communities for troubleshooting and maintenance and methods for performing the same. As discussed above, MFDs are complicated devices that run on complex software. The MFDs may have hundreds of settings that range from settings associated with how the software operates, communication settings for network communications, print job parameters, and the like.

When an MFD malfunctions, the customer may have to call a service provider or manufacturer of the MFD to repair the MFD. This may take time for a technician to arrive on site, troubleshoot the problem, and fix the MFD. This can cause significant downtime for the customer using the MFD, as well as the manufacturer to have enough technicians ready to deploy when errors occur.

The present disclosure leverages MFD communities that can allow MFDs within the community to help troubleshoot and/or perform maintenance on each other. For example, when an MFD has an error or a feature is not operating correctly, other MFDs within the MFD community can offer to help via configuration files. The configuration files can be associated with the feature that is not operating correctly with the latest configuration or settings of components and software used by the feature.

As a result, the service provider can reduce costs associated with hiring technicians and the number of times a technician has to travel to a customer site. In addition, the customers who use the MFDs may have downtime reduced as the MFDs may be able to correct errors or malfunctions before the customer notices.

Figure 1:
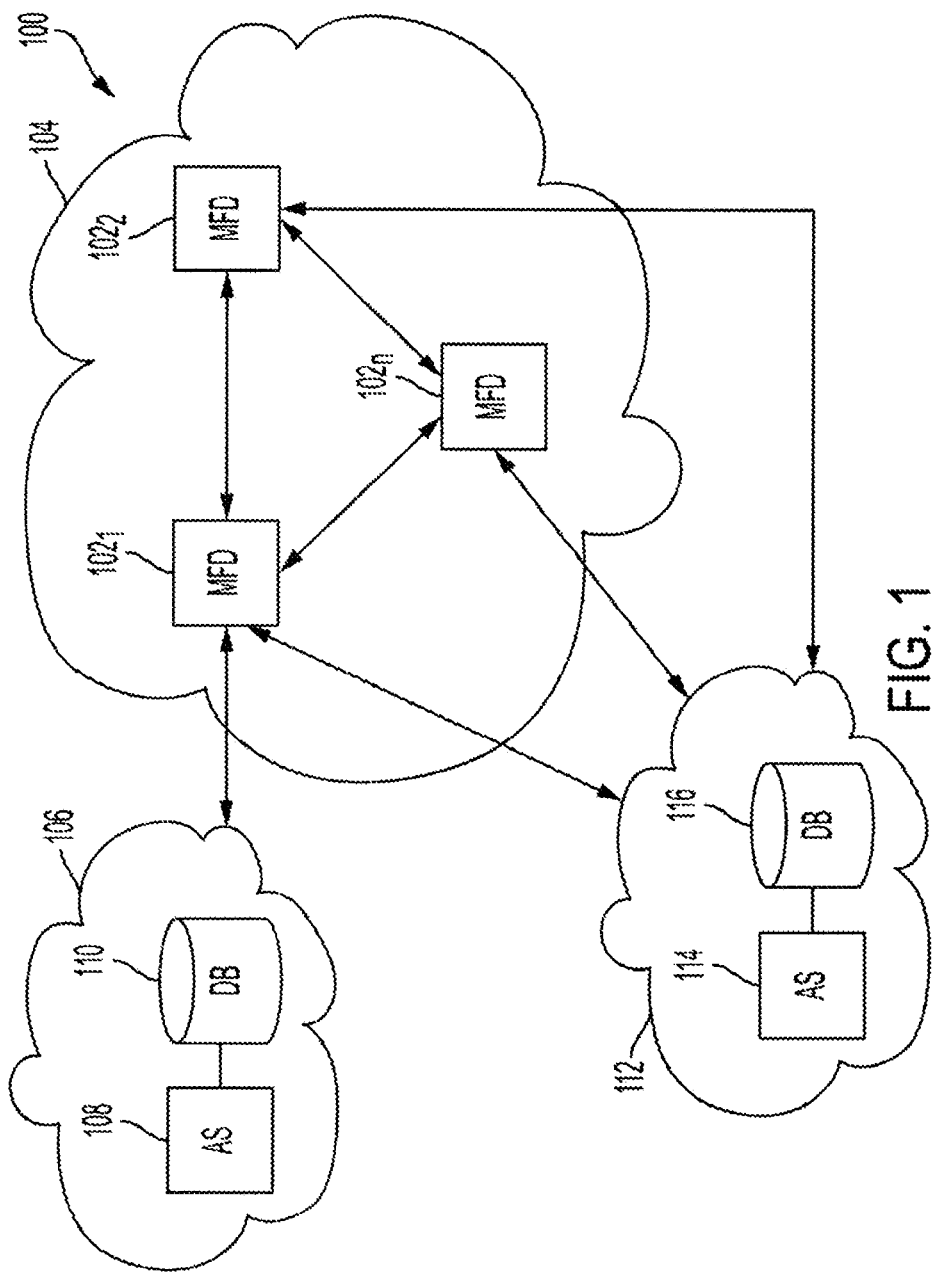
FIG. 1 illustrates an example network that includes a community of MFDs of the present disclosure for troubleshooting and maintenance.

FIG. 1 illustrates an example network 100 of the present disclosure. The network 100 may include a community 104 of multi-function devices (MFDs) 102$_1$ to 102$_n$ (hereinafter also referred to individually as an MFD 102 or collectively as MFDs 102). The network 100 may also include an internet protocol (IP) network 106. The IP network 106 may include an application server (AS) 108 and a database (DB) 110. The IP network 106 may be managed and operated by a manufacturer or service provider of the MFDs 102.

In one embodiment, the DB 110 may store various updates to firmware, applications, operating system software, communication device settings, network settings, and the like for the MFDs 102. The AS 108 may periodically push the updates to one of the MFDs 102. As discussed in further detail below, one of the MFDs 102 may be designated as a "parent" MFD that periodically receives updates to all of the software and settings on the parent MFD. The parent MFD may have the most up to date software and settings for all of the features on the MFD. The parent MFD may push configuration files of the settings for various features that can be used by the other MFDs 102 within the community 104 for troubleshooting and/or maintenance.

In one embodiment, the network 100 may also include an IP network 112 that includes an AS 114 and DB 116. The AS 114 and the DB 116 may be part of remote services that can be accessed by the MFDs 102. For example, the remote services may include a cloud storage provider. The MFDs 102 may scan documents to the AS 114 that can be saved in the DB 116. The MFDs 102 may also retrieve documents stored in the DB 116 via the AS 114 to print or email as attachments.

In one embodiment, the community 104 may include the MFDs 102. Within an enterprise location or building there may be several communities of MFDs 102. The communities 104 may have an equal number of MFDs 102 or may have different numbers of MFDs 102.

In one embodiment, a community 104 of MFDs 102 may be defined as a group of MFDs 102 that are within a common network. For example, the common network may be a WiFi network within the enterprise location. In one embodiment, the community 104 may be further defined to be a particular subnet within the WiFi network.

In one embodiment, the community 104 of MFDs 102 may be defined as a group of MFDs 102 that are within a user defined boundary and that are within range of one another via a local communication interface. For example, the community 104 may include MFDs 102 that are within near field communications (NFC) radio reception of one another or Bluetooth radio reception of one another. As discussed in further detail below, one of the features of the MFDs 102 that may malfunction could include a network communication interface or an ability to access the Internet. In such a case, the MFDs 102 within the community 104 may be able to communicate with one another via NFC or Bluetooth.

In one embodiment, the community 104 of MFDs 102 may be defined by those MFDs that are directly connected to one another. For example, the MFDs $102_1$ to $102_n$ may be directly connected to one another via a wired Ethernet connection. Thus, even if wireless communication to the remote services hosted by the IP network 112 fails, the MFDs 102 may be able to troubleshoot one another via the direct wired Ethernet connection.

It should be noted that the network 100 has been simplified for ease of explanation and may include other devices and components that are not shown. For example, the network 100 may include gateways, switches, routers, firewalls, access points, access networks, and the like.

Figure 2:
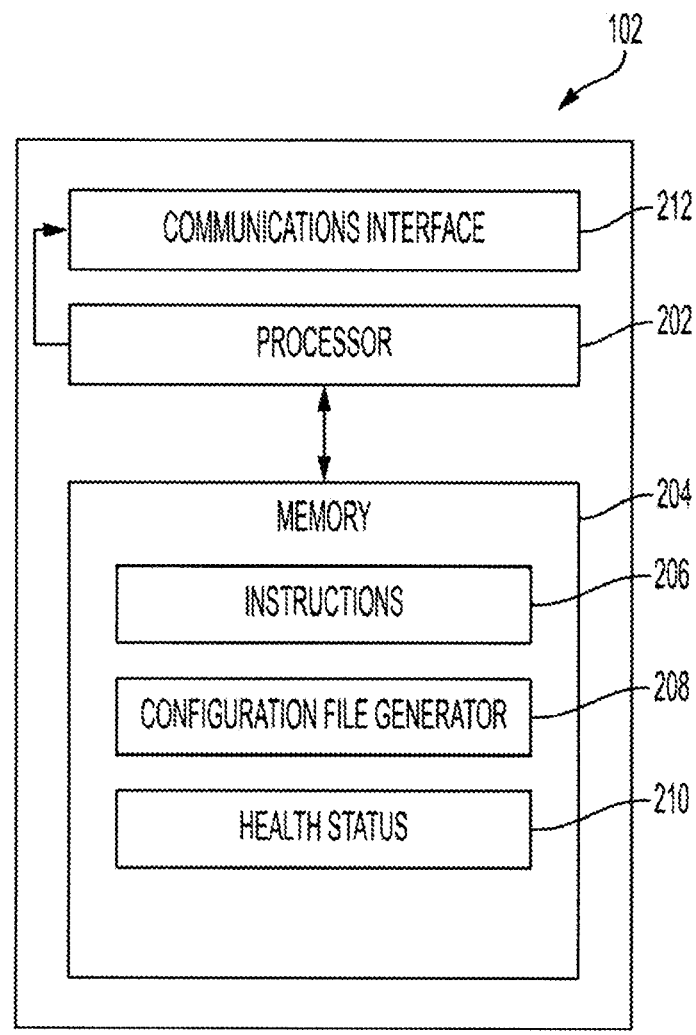
FIG. 2 illustrates a block diagram of an example MFD of the present disclosure.

FIG. 2 illustrates a block diagram of an example MFD 102 illustrated in FIG. 1. In one embodiment, the MFD 102 may include a processor 202, a memory 204, and a communication interface 212. The processor 202 may be communicatively coupled to the memory 204, and the communication interface 212. The processor 202 may control operation of the communication interface 212 and may receive and/or transmit information (e.g., updates, configuration files, and the like) via the communication interface 212.

In one embodiment, the communication interface 212 may be to establish a communication path between the other MFDs 102 within the community 104 and/or the AS 108 via the IP network 106. For example, the communication interface 212 may be a wireless or wired communication interface. For example, the communication interface 212 may be a WiFi radio, an Ethernet connection, a fax over IP connection that uses an RJ-111 connection, a cellular radio, and the like.

In one embodiment, the communication interface 212 may also include a local communication interface that allows the MFDs 102 to communicate with other MFDs 102 within the community 104 even if the ability of the communication interface 212 to reach the IP network 106 fails. For example, the MFD $102_2$ may be unable to reach the remote services in the IP network 112. However, the MFD $102_2$ may still communicate with the MFDs $102_1$ and $102_n$ via local communication interfaces such as NFC, Bluetooth Radio, or a directly wired Ethernet connection to MFDs $102_1$ and $102_n$.

In one embodiment, the memory 204 may be any type of non-transitory computer readable medium. For example, the memory 204 may be a hard disk drive, a solid state drive, a random access memory, a read only memory, and the like. The memory 204 may store instructions 206 that are executed by the processor 202 to perform the functions described herein. For example, the instructions may cause the processor 202 to perform operations described in FIGS. 3 and 4 or the method 500 illustrated in FIG. 5, and discussed in further detail below.

In one embodiment, the memory 204 may also store a configuration file generator 208 and a health status 210. In one embodiment, the configuration file generator 208 may generate a configuration file for a feature or features that may be operating incorrectly on another MFD 102. For example, the configuration file generator may generate a file that includes the current settings of an MFD 102 where the feature is operating correctly. The configuration file can then be generated to another MFD 102 where the feature is operating incorrectly to fix the issue, as discussed in further detail below.

For example, if the feature that is operating incorrectly is a communication feature, the configuration file may include various settings, values, configurations, a latest version of software for the feature, and the like. For example, if the communication feature is ability to access the Internet, the configuration file may include various settings for a particular Wi-Fi network, proxy settings for the communications interface 212, port assignments for the communications interface 212, and the like.

In one embodiment, the health status 210 may indicate whether the MFD 102 is experiencing an error or malfunction. The health status 210 may be a descriptor or may have a numerical value. For example, the descriptor may include "fully operational," "partially operational," and "not operational". The descriptor may apply to each feature or to the overall operation of the MFD 102.

For example, the features may include access to remote services, access to the Internet via the wireless communication interface, image quality, ability to update applications, and the like. The descriptor may be associated with each feature for the health status 210. For example, access to remote services may be partially operational, access to the Internet may be fully operational, ability to update applications may be not operational, and the like.

In one embodiment, the descriptor may apply to the overall operation of the MFD 102. For example, if the MFD 102 is not operational, none of the features may be operating correctly. If the MFD 102 is partially operational, then some of the features may be operating correctly and other features may be operating incorrectly. The MFD 102 may track which features are operating incorrectly so that the MFD 102 can notify other MFDs 102 of which features are operating incorrectly when broadcasting a help message, as described below.

The health status may also be a numerical value, as noted above. For example, values of 0 and 1 may be used to indicate fully operational or not fully operational. In another example, values of 0, 1, and 2 may be used to indicate fully operational, partially operational, and not operational. Similar to the descriptors, the numerical values can be applied to each feature or to the overall operational status of the MFD 102.

In one embodiment, the health status may be an active fault or status code on the MFD 102. For example, the MFDs 102 may be pre-programmed with fault or status codes that can represent a specific error or fault that is occurring. The fault or status codes can also indicate a severity of the fault that is occurring.

It should be noted that the MFD 102 has been simplified for ease of explanation in FIG. 2 and may include other components that are not shown. For example, the MFD 102 may also include a paper tray, an optical scanner, one or more printheads (e.g., for printing fluid or toner), a digital front end, one or more finishing modules, and the like.

Figure 3:
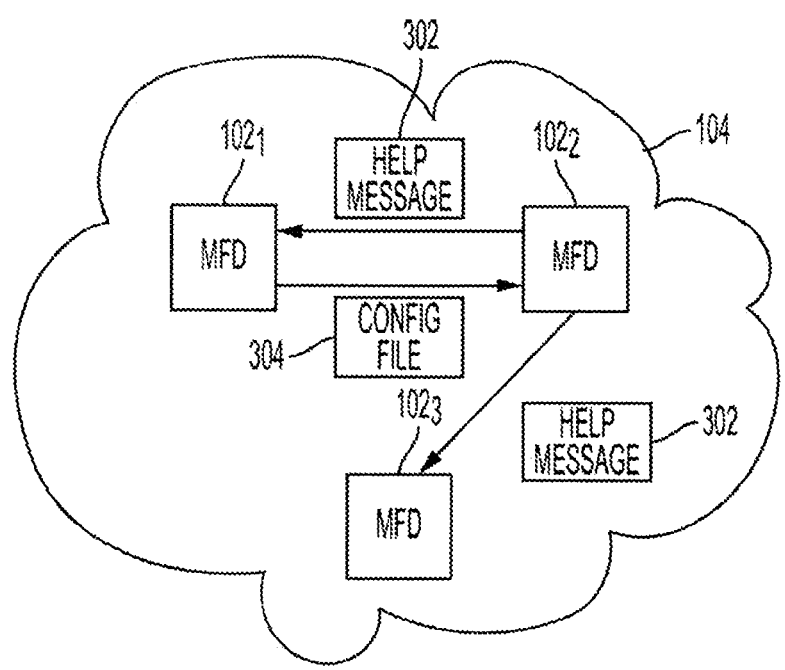
FIG. 3 illustrates an example of an MFD requesting help from the community of MFDs of the present disclosure.

The MFDs 102 within a community 104 may be able to push configuration files to help other MFDs 102 within the community 104 or to request help to receive a configuration file from another MFD 102 within the community 104. FIG. 3 illustrates an example where an MFD 102$_2$ broadcasts a help message 302 to receive a configuration file 304 for troubleshooting a feature that is operating incorrectly. Although three MFDs 102$_1$, 102$_2$, and 102$_3$ are illustrated in FIG. 3, it should be noted that the community 104 may include any number of MFDs 102.

In one embodiment, the MFD 102$_2$ may determine that a feature is operating incorrectly. For example, the feature may be a communication operation, such as ab ability to access a remote service feature. The MFD 102$_2$ may not be able to send data or receive updates from the AS 114 in the IP network 112.

In response, the MFD 102$_2$ may generate a help message 302 that can be transmitted or broadcasted to all other MFDs 102$_1$ and 102$_3$ that are part of the community 104. In one embodiment, the help message 302 may include an identification of the feature that is operating incorrectly and an identification of the MFD 102$_2$. The identification of the feature may allow the other MFDs 102$_1$ and 102$_3$ to generate the correct configuration file with the settings for that feature.

The identification of the MFD 102$_2$ may allow the other MFDs 102$_1$ and 102$_3$ to transmit the configuration file to the correct MFD. For example, the identification of the MFD 102$_2$ may include an IP address of the MFD 102$_2$, a media access control (MAC) identification number of the MFD 102$_2$, a name of the MFD 102$_2$ (e.g., hallway printer, accounting printer, and the like), or any other type of identification that can be used to route the configuration file 304 back to the MFD 102$_2$.

The MFDs 102$_1$ and 102$_3$ may receive the help message 302. If the MFDs 102$_1$ and 102$_3$ have fully operational health statuses, the MFDs 102$_1$ and 102$_3$ may generate a configuration file 304 and transmit the configuration file 304 back to the MFD 102$_2$ in response to the help message 302.

In one embodiment, if both MFDs 102$_1$ and 102$_3$ have a fully operational health status, both MFDs 102$_1$ and 102$_3$ may generate the configuration file 304 and transmit the configuration file 304 to the MFD 102$_2$. In one embodiment, the MFD 102$_2$ may upload any one of the configuration files 304 that are received to troubleshoot the feature that is operating incorrectly.

In one embodiment, the MFD 102$_1$ may be designated as the "parent MFD," as described above. For example, the MFD 102$_1$ may be in periodic communication with the AS 108 in the IP network 106. The AS 108 may push periodic updates to the MFD 102$_1$ to ensure that all of the software and/or settings for the features on the MFD 102$_1$ are updated with the latest versions. Thus, in one embodiment, the MFD 102$_2$ may prioritize the configuration file 304 received from the parent MFD 102$_1$. In other words, if both the MFD 102$_1$ and 102$_3$ were to send a configuration file 304, the MFD 102$_2$ may upload the configuration file 304 received from the parent MFD 102$_1$.

The MFD 102$_2$ may upload the configuration file 304 and may determine that the feature is operating correctly again. The MFD 102$_2$ may update its own health status to fully operational. In one embodiment, the MFD 102$_2$ may broadcast a message or notification to all other MFDs 102$_1$ and 102$_3$ in the community 104 indicating that the issue causing the feature to operate incorrectly has been corrected.

Figure 4:
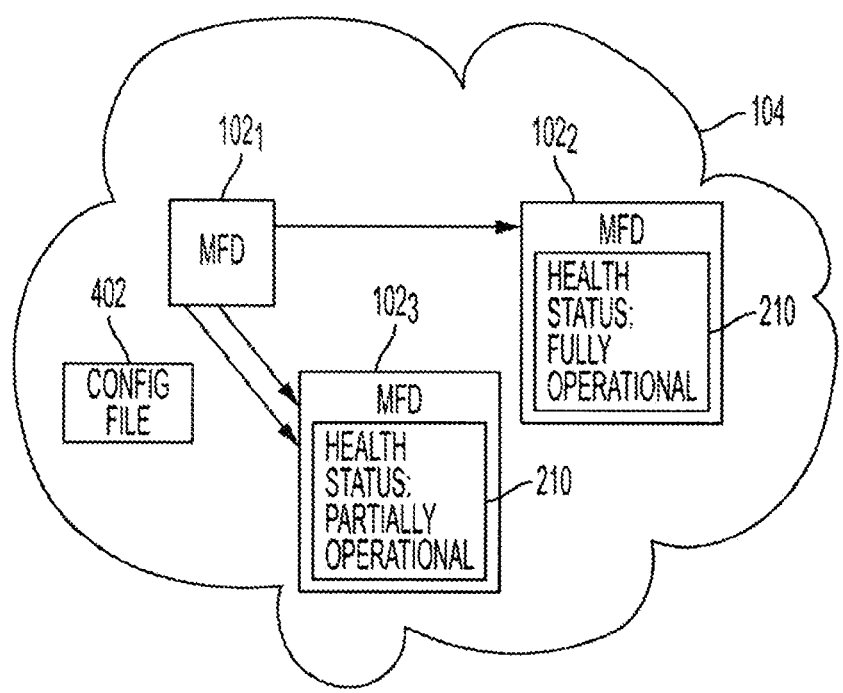
FIG. 4 illustrates an example of an MFD offering help to another MFD in the community of MFDs of the present disclosure.

FIG. 4 illustrates an example where the MFD 102$_1$ pushes or publishes a configuration file 402. Although three MFDs 102$_1$, 102$_2$, and 102$_3$ are illustrated in FIG. 4, it should be noted that the community 104 may include any number of MFDs 102.

As described above, one of the MFDs 102 may be designated as a parent MFD. In FIG. 4, the MFD 102$_1$ may be designated as the parent MFD. As the parent MFD, the MFD 102$_1$ may receive periodic updates from the AS 108, as described above. Thus, the MFD 102$_1$ may have the most up to date settings, values, and configurations for the various features on the MFDs 102. The MFD 102$_1$ may be responsible for periodically monitoring the health status 210 of the other MFDs 102$_2$ and 102$_3$ in the community 104.

The MFD 102$_3$ may change the health status 210 from fully operational to partially operational, as shown in FIG. 4. The MFD 102$_1$ may detect this change. The MFD 102$_1$ may communicate with the MFD 102$_3$ to determine which features are operating incorrectly. The MFD 102$_1$ may generate a configuration file 402 for those features that are operating incorrectly and may transmit the configuration file 402 to the MFD 102$_3$. The MFD 102$_3$ may upload the configuration file 402 to address the issues with those features that are operating incorrectly. If the configuration file 402 corrects the issues, the MFD 102$_3$ may update the health status 210 back to fully operational.

In one embodiment, the monitoring performed by the MFD 102$_1$ may be optional. For example, the MFD 102$_1$ may simply publish all of the settings and configurations for all features in one or more configuration files 402. In other words, the MFD 102$_1$ may publish the configuration files 402 without solicitation or a request for help from any of the MFDs 102$_2$ and 102$_3$ within the community 104. Rather, the MFD 102$_1$ may push the configuration files 402 to the other MFDs 102$_2$ and 102$_3$. The MFDs 102$_2$ and 102$_3$ may store the configuration files 402 with a time stamp. Thus, as additional configuration files 402 are pushed by the MFD 102₁, the MFDs 102₂ and 102₃ may keep the most current configuration file 402 and may discard previously received configuration files 402.

When a feature fails on the MFDs 102₂ or 102₃, the MFDs 102₂ or 102₃ may then upload the stored configuration files 402 from the MFD 102₁. As a result, the MFDs 102₂ or 102₃ may receive and upload the configuration file 402 to address features that operate incorrectly without having to send the help message 302, as illustrated in FIG. 3 and discussed above.

As a result, the MFDs 102 within the community 104 may be able to troubleshoot and/or maintain each other. Thus, the amount of times a technician is dispatched may be reduced to save costs and expenses for the service provider or manufacturer of the MFDs 102.

Figure 5:
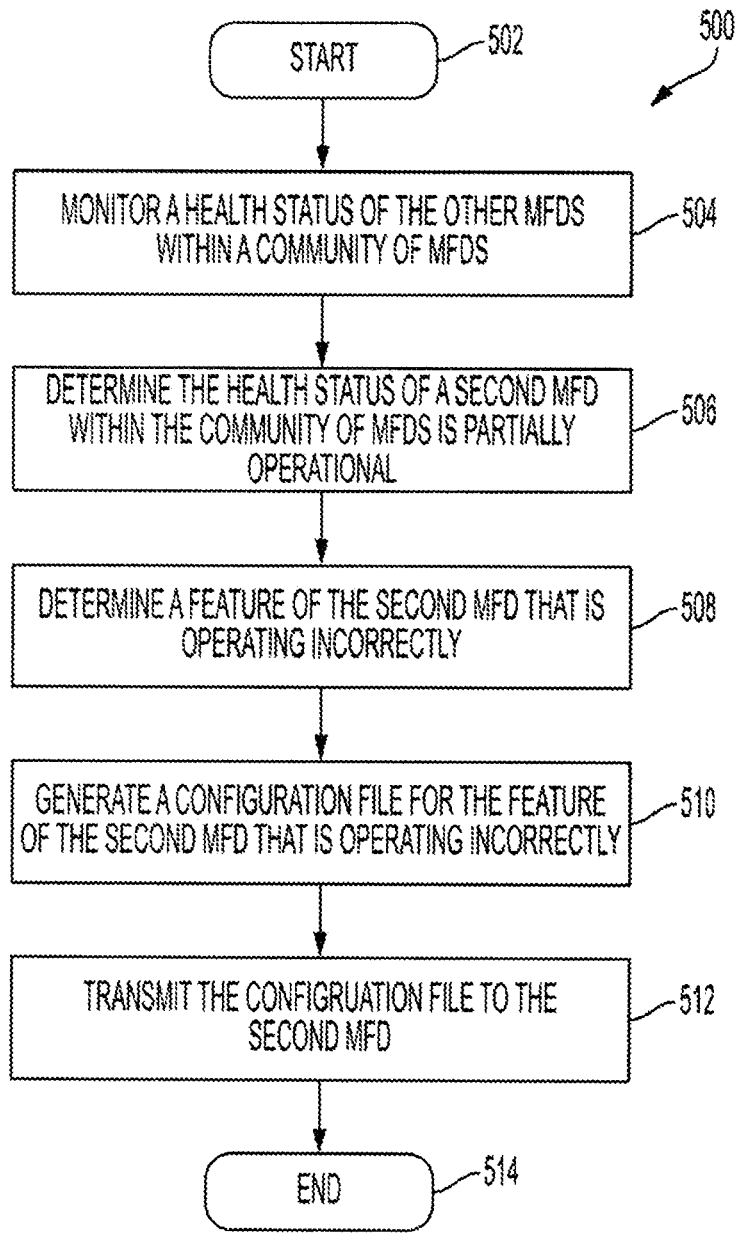
FIG. 5 illustrates a flow chart for a method of troubleshooting an MFD via another MFD in a community of MFDs of the present disclosure.

FIG. 5 illustrates a flow chart of an example method 500 for troubleshooting an MFD via another MFD in a community of MFDs of the present disclosure. In one embodiment, the method 500 may be performed by any of the MFDs 102 described above or by an apparatus such as the apparatus 600 illustrated in FIG. 6 and discussed below.

In one embodiment, the method 500 begins at block 502. At block 504, the method 500 monitors a health status of other MFDs within a community of MFDs. For example, the MFDs may monitor each other's health statuses. In one embodiment, only those MFDs with a fully operational health status may perform the monitoring. In another embodiment, the MFD that is designated as the parent MFD may perform the monitoring.

At block 506, the method 500 determines that the health status of a second MFD within the community of MFDs is partially operational. For example, the health status of one of the MFDs in the community that is being monitored may have been degraded. Thus, the health status may be degraded to any level such as partially operational, not operational, and the like, from a health status of fully operational.

At block 508, the method 500 determines a feature of the second MFD that is operating incorrectly. For example, the MFD may communicate with the second MFD to determine which feature is operating incorrectly.

The feature may be any feature associated with the second MFD. For example, the feature may be a communication feature. The communication feature may be an ability to access remote service features, an ability to access the Internet, an ability to access application updates, an ability to access email document attachments, an ability to access print settings for a particular image quality, and the like.

At block 510, the method 500 generates a configuration file for the feature of the second MFD that is operating incorrectly. The configuration file may include all of the settings, values, configurations, and the like associated with the feature identified by the second MFD that is operating incorrectly. For example, if the feature is a communication feature, the configuration file may include particular proxy settings, transmission control protocol/Internet protocol (TCP/IP) settings, port configurations, updated driver versions for the communication interface, and the like.

The configuration file may be an executable file that can be launched by the second MFD. The configuration file may automatically change the settings, values, or configurations associated with the feature in the second MFD when executed to match the settings, values, or configurations contained in the configuration file.

At block 512, the method 500 transmits the configuration file to the second MFD. For example, the configuration file may be transmitted over the Internet (e.g., a WiFi network). However, if the second MFD is experiencing network connectivity problems, then the configuration file may be transmitted over a local communication interface (e.g., via NFC or Bluetooth), as described above.

The second MFD may upload the configuration file and determine if the configuration file fixed the errors in the feature that was operating incorrectly. If the feature is corrected, the second MFD may update its health status back to fully operational.

In one embodiment, the MFD may also request help from other MFDs within the community. For example, the MFD may determine that a respective feature of the MFD is operating incorrectly.

In response to determining that a respective feature of the MFD is operating incorrectly, the MFD may transmit or broadcast a help message to the other MFDs within the community of MFDs. The help message may indicate that the respective feature of the MFD is operating incorrectly. The help message may include an identification of the feature that is operating incorrectly and an identification of the MFD to receive the configuration file.

The MFD may receive a respective configuration file for the respective feature of the MFD that is operating incorrectly from a third MFD within the community of MFDs that has a health status of fully operational. For example, the third MFD within the community may have a health status of fully operational. The third MFD may generate a configuration file for the respective feature and may transmit the configuration file to the MFD based on the identification information of the MFD received in the help message.

The MFD may upload the respective configuration file. For example, the configuration file may change the settings, values, or configurations associated with the feature that is operating incorrectly.

The MFD may determine that the respective feature is operating correctly after the respective configuration file is uploaded. For example, the MFD may have full access again to the remote feature services that it did not have access to before the configuration file was uploaded.

The MFD may update a health status of the MFD to fully operational. The MFD may also transmit a notification back to the third MFD to indicate that the configuration file addressed the issue with the respective feature.

Thus, the MFD may not only push or publish configuration files to troubleshoot other MFDs within the community of MFDs, but the MFD may also request help from the other MFDs to fix features that are malfunctioning on itself. As a result, the ability of the MFDs within the community of MFDs to troubleshoot each other may minimize the need to send customer service experts or technicians to resolve some malfunctions or errors. At block 514, the method 500 ends.

Figure 6:
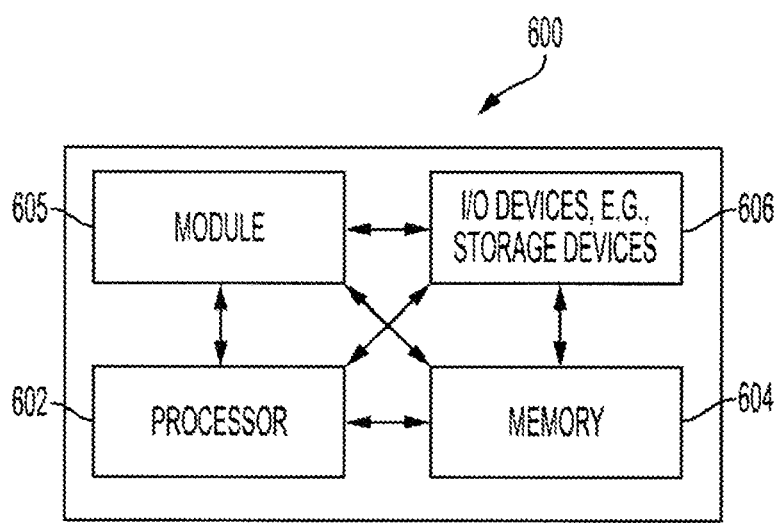
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for troubleshooting an MFD via another MFD in a community of MFDs, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)).

Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for troubleshooting an MFD via another MFD in a community of MFDs (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for troubleshooting an MFD via another MFD in a community of MFDs (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD), comprising:
a communication interface to establish a communication session with other MFDs within a community of MFDs;
a processor; and
a non-transitory computer readable medium storing instructions, which when executed by the processor, cause the processor to:
monitor a health status of the other MFDs within the community of MFDs;
determine that the health status of a second MFD within the community of MFDs is partially operational based on a help broadcast message from the second MFD that includes an identification of a feature of the second MFD that is operating incorrectly due to a malfunction and an identification of the second MFD;
determine the feature of the second MFD within the community of MFDs that is operating incorrectly based on the help broadcast message;
confirm that the feature is operating correctly on the MFD based on a health status value of the MFD;
determine current settings for the feature on the MFD;
generate a configuration file that includes the current settings on the MFD for the feature to fix the feature on the second MFD within the community of MFDs that is operating incorrectly; and
transmit the configuration file to the second MFD within the community of MFDs.

2. The MFD of claim 1, wherein the feature comprises a communication operation.

3. The MFD of claim 2, wherein the communication operation comprises accessing a remote services feature.

4. The MFD of claim 3, wherein the configuration file is to update network connection settings of the second MFD within the community of MFDs.

5. The MFD of claim 1, wherein the MFD is a parent MFD that receives periodic updates for all software from a remote server.

6. The MFD of claim 1, wherein the community of MFDs comprises MFDs that are on a common network.

7. The MFD of claim 6, wherein the common network comprises a particular WiFi network.

8. The MFD of claim 7, wherein the common network comprises a particular subnet of the particular WiFi network.

9. A method, comprising:
monitoring, via a processor of a first multi-function device (MFD), a health status of other MFDs within a community of MFDs;
determining, via the processor, that the health status of a second MFD within the community of MFDs is partially operational based on a help broadcast message from the second MFD that includes an identification of a feature of the second MFD that is operating incorrectly due to a malfunction and an identification of the second MFD;
determining, via the processor, the feature of the second MFD within the community of MFDs that is operating incorrectly based on the help broadcast message;
confirming, via the processor, that the feature is operating correctly on the first MFD based on a health status value of the first MFD;
determining, by the processor, current settings for the feature of the first MFD;
generating, via the processor; a configuration file that includes the current settings on the first MFD for the feature to fix the feature on the second MFD within the community of MFDs that is operating incorrectly; and
transmitting, via the processor, the configuration file to the second MFD within the community of MFDs.

10. The method of claim 9, further comprising:
determining, via the processor, that a respective feature of the first MFD is operating incorrectly;
transmitting, via the processor, a help message to the other MFDs within the community of MFDs;
receiving, via the processor, a respective configuration file for the respective feature of the first MFD that is operating incorrectly from a third MFD within the community of MFDs that has a health status of fully operational;
uploading, via the processor, the respective configuration file;

determining, via the processor, that the respective feature is operating correctly after the respective configuration file is uploaded; and updating, via the processor, a health status of the first MFD to fully operational.

\* \* \* \* \*